(12) United States Patent
Hawes

(10) Patent No.: US 8,087,583 B2
(45) Date of Patent: Jan. 3, 2012

(54) ASSOCIATING MEDIA THROUGH ENCODING

(75) Inventor: Jonathan L. Hawes, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 1018 days.

(21) Appl. No.: 11/082,182

(22) Filed: Mar. 15, 2005

(65) Prior Publication Data

US 2005/0258247 A1 Nov. 24, 2005

Related U.S. Application Data

(63) Continuation of application No. 10/172,506, filed on Jun. 14, 2002, now Pat. No. 6,869,023, which is a continuation-in-part of application No. 10/094,593, filed on Mar. 6, 2002, now abandoned.

(60) Provisional application No. 60/356,881, filed on Feb. 12, 2002.

(51) Int. Cl.
*G06K 5/00* (2006.01)
(52) U.S. Cl. ........................................ 235/380
(58) Field of Classification Search .................. 235/380; 382/306
See application file for complete search history.

(56) References Cited

U.S. PATENT DOCUMENTS

| | | | |
|---|---|---|---|
| 660,571 A | 7/1903 | Ito | |
| 5,053,608 A * | 10/1991 | Senanayake | ........... 235/380 |
| 5,239,108 A | 8/1993 | Yokoyama et al. | |
| 5,385,371 A | 1/1995 | Izawa | |
| 5,432,329 A * | 7/1995 | Colgate et al. | ............. 235/487 |
| 5,490,217 A | 2/1996 | Wang et al. | |
| 5,502,576 A | 3/1996 | Ramsay et al. | |
| 5,505,494 A | 4/1996 | Belluci et al. | |
| 5,506,697 A * | 4/1996 | Li et al. | .................. 358/448 |
| 5,515,451 A | 5/1996 | Tsuji et al. | |
| 5,602,377 A * | 2/1997 | Beller et al. | ............. 235/462.15 |
| 5,652,626 A | 7/1997 | Kawakami et al. | |
| 5,664,018 A | 9/1997 | Leighton | |
| 5,668,636 A | 9/1997 | Beach et al. | |
| 5,692,073 A | 11/1997 | Cass | |
| 5,710,834 A | 1/1998 | Rhoads | |
| 5,717,940 A | 2/1998 | Peairs | |

(Continued)

FOREIGN PATENT DOCUMENTS

EP   493 091   7/1992

(Continued)

OTHER PUBLICATIONS

Bloomberg, "Embedding Digital Data on Paper in Iconic Text" SPIE vol. 3027, Document Recognition IV, pp. 67-80 (1997).

(Continued)

*Primary Examiner* — Jamara A Franklin

(57) ABSTRACT

A method of associating first media with at least second media is described where the first media comprises encoded first auxiliary information. The first auxiliary information is auxiliary to the first media. The method includes receiving electronic data representing at least a portion of the first media, the electronic data being obtained from a portable storage device; decoding the encoded first auxiliary information from the electronic data to obtain the first auxiliary information; providing second auxiliary information, wherein the second auxiliary information is based on the first auxiliary information and is auxiliary to the second media; and encoding the second auxiliary information in the second media by altering data representing the second media to yield encoded second media, wherein the second media comprises an electronic form, storing the encoded second media in a storage device in a handheld device.

25 Claims, 3 Drawing Sheets

U.S. PATENT DOCUMENTS

| | | | |
|---|---|---|---|
| 5,765,176 A | 6/1998 | Bloomberg | |
| 5,787,186 A | 7/1998 | Schroeder | |
| 5,790,662 A | 8/1998 | Valerij et al. | |
| 5,809,317 A | 9/1998 | Kogan et al. | |
| 5,832,119 A | 11/1998 | Rhoads | |
| 5,838,458 A | 11/1998 | Tsai | |
| 5,841,886 A | 11/1998 | Rhoads | |
| 5,841,978 A | 11/1998 | Rhoads | |
| 5,859,935 A | 1/1999 | Johnson et al. | |
| 5,862,260 A | 1/1999 | Rhoads | |
| 5,892,900 A | 4/1999 | Ginter et al. | |
| 5,893,908 A | 4/1999 | Cullen et al. | |
| 5,901,224 A | 5/1999 | Hecht | |
| 5,943,422 A | 8/1999 | Van Wie et al. | |
| 5,962,834 A * | 10/1999 | Markman | 235/385 |
| 5,978,477 A | 11/1999 | Hull et al. | |
| 5,978,773 A | 11/1999 | Hudetz et al. | |
| 5,979,941 A | 11/1999 | Mosher et al. | |
| 5,986,651 A | 11/1999 | Reber et al. | |
| 5,995,978 A | 11/1999 | Cullen et al. | |
| 6,006,226 A | 12/1999 | Cullen et al. | |
| 6,024,287 A | 2/2000 | Takai et al. | |
| 6,085,205 A | 7/2000 | Peairs et al. | |
| 6,122,403 A | 9/2000 | Rhoads | |
| 6,141,753 A | 10/2000 | Zhao et al. | |
| 6,182,090 B1 | 1/2001 | Peairs | |
| 6,192,165 B1 * | 2/2001 | Irons | 382/306 |
| 6,199,073 B1 | 3/2001 | Peairs et al. | |
| 6,286,036 B1 | 9/2001 | Rhoads | |
| 6,295,391 B1 * | 9/2001 | Rudd et al. | 382/313 |
| 6,321,981 B1 * | 11/2001 | Ray et al. | 235/380 |
| 6,324,573 B1 | 11/2001 | Rhoads | |
| 6,330,976 B1 * | 12/2001 | Dymetman et al. | 235/487 |
| 6,332,031 B1 | 12/2001 | Rhoads et al. | |
| 6,334,721 B1 | 1/2002 | Horigane | |
| 6,351,815 B1 | 2/2002 | Adams | |
| 6,408,331 B1 | 6/2002 | Rhoads | |
| 6,411,725 B1 | 6/2002 | Rhoads | |
| 6,445,468 B1 | 9/2002 | Tsai | |
| 6,466,329 B1 | 10/2002 | Mukai | |
| 6,505,160 B1 | 1/2003 | Levy et al. | |
| 6,513,717 B2 | 2/2003 | Hannigan | |
| 6,522,770 B1 | 2/2003 | Seder et al. | |
| 6,546,112 B1 | 4/2003 | Rhoads | |
| 6,577,746 B1 | 6/2003 | Evans et al. | |
| 6,580,815 B1 * | 6/2003 | Grajewski et al. | 382/124 |
| 6,590,998 B2 | 7/2003 | Rhoads | |
| 6,614,914 B1 | 9/2003 | Rhoads et al. | |
| 6,751,336 B2 | 6/2004 | Zhao | |
| 6,771,981 B1 * | 8/2004 | Zalewski et al. | 455/557 |
| 6,786,397 B2 | 9/2004 | Silverbrook et al. | |
| 6,804,376 B2 | 10/2004 | Rhoads et al. | |
| 6,804,377 B2 | 10/2004 | Reed et al. | |
| 6,804,378 B2 | 10/2004 | Rhoads | |
| 6,829,368 B2 | 12/2004 | Meyer et al. | |
| 6,869,023 B2 | 3/2005 | Hawes | |
| 6,891,959 B2 | 5/2005 | Reed et al. | |
| 6,912,295 B2 | 6/2005 | Reed et al. | |
| 6,973,197 B2 | 12/2005 | Miller | |
| 7,006,661 B2 | 2/2006 | Miller et al. | |
| 7,016,516 B2 | 3/2006 | Rhoads | |
| 7,043,052 B2 | 5/2006 | Rhoads | |
| 7,050,603 B2 | 5/2006 | Rhoads et al. | |
| 7,058,697 B2 | 6/2006 | Rhoads | |
| 7,152,786 B2 | 12/2006 | Brundage et al. | |
| 7,171,018 B2 | 1/2007 | Rhoads et al. | |
| 7,194,106 B2 | 3/2007 | Brundage et al. | |
| 7,209,573 B2 | 4/2007 | Evans et al. | |
| 7,330,563 B2 | 2/2008 | Rhoads | |
| 7,349,555 B2 | 3/2008 | Rhoads | |
| 7,436,976 B2 | 10/2008 | Levy et al. | |
| 7,437,430 B2 | 10/2008 | Rhoads | |
| 7,454,035 B2 | 11/2008 | Miller et al. | |
| 7,461,136 B2 | 12/2008 | Rhoads | |
| 7,577,273 B2 | 8/2009 | Rhoads et al. | |
| 7,620,200 B2 | 11/2009 | Rhoads | |
| 7,620,253 B2 | 11/2009 | Miller et al. | |
| 7,693,965 B2 | 4/2010 | Rhoads | |
| 7,724,920 B2 | 5/2010 | Rhoads | |
| 7,770,013 B2 | 8/2010 | Rhoads et al. | |
| 7,805,500 B2 | 9/2010 | Rhoads | |
| 7,806,322 B2 | 10/2010 | Brundage et al. | |
| 7,949,149 B2 | 5/2011 | Rhoads et al. | |
| 7,978,874 B2 | 7/2011 | Levy | |
| 2001/0116852 | 8/2001 | Peairs et al. | |
| 2001/0022667 A1 | 9/2001 | Yoda | |
| 2001/0043362 A1 | 11/2001 | Hull et al. | |
| 2002/0080396 A1 | 6/2002 | Silverbrook et al. | |
| 2002/0080964 A1 | 6/2002 | Stone et al. | |
| 2002/0170966 A1 | 11/2002 | Hannigan et al. | |
| 2003/0056104 A1 | 3/2003 | Carr et al. | |
| 2003/0150922 A1 | 8/2003 | Hawes | |
| 2004/0181671 A1 | 9/2004 | Brundage et al. | |
| 2005/0013462 A1 | 1/2005 | Rhoads | |
| 2005/0094848 A1 | 5/2005 | Carr et al. | |
| 2005/0258247 A1 | 11/2005 | Hawes | |
| 2006/0171559 A1 | 8/2006 | Rhoads | |
| 2009/0129627 A1 | 5/2009 | Levy et al. | |
| 2009/0172128 A1 | 7/2009 | Rhoads | |
| 2010/0067737 A1 | 3/2010 | Miller et al. | |
| 2010/0128924 A1 | 5/2010 | Rhoads | |
| 2011/0040780 A1 | 2/2011 | Rhoads | |
| 2011/0066734 A1 | 3/2011 | Rhoads | |

FOREIGN PATENT DOCUMENTS

| | | |
|---|---|---|
| EP | 975147 | 1/2000 |
| EP | 1147495 | 10/2001 |
| GB | 2344482 | 6/2000 |
| GB | 2346110 | 8/2000 |
| JP | 3185585 | 8/1991 |
| JP | 08-505898 | 2/1996 |
| WO | WO98/20411 | 5/1998 |
| WO | WO02/03385 | 1/2002 |
| WO | WO0239719 | 5/2002 |

OTHER PUBLICATIONS

Johnson, et al., "Bridging the Paper and Electronic Worlds: The Paper User Interface", Interchi '93, pp. 507-512, Apr. 1993.

Newman, William, et al., "A Desk Supporting Computer-Based Interaction with paper Documents," ACM Conference on Human Factors in Computing Systems (CHI '92) May 3-7, 1992, pp. 587-592.

Peairs, "Iconic Paper," Proceedings of the Third International Conference of Document Analysis and Recognition, Aug. 14-16, 1995, 1174-1179.

Rao, et al., "Protofoli: Storing and Finding the Information Worker's Paper Documents in an Electronic File Cabinet," Human Factors in Computing Systems (CHI '94), pp. 180-186, Boston, MA, Apr. 1994.

Whittaker, et al., "Back to the Future: Pen and Paper Technology Supports Complex Group Coordination," CHI '95, Conference on Human Factors in Computing Systemsm, Denver, Colorado (May 7-11, 1995) (text copy obtained from ACM).

U.S. Appl. No. 60/356,881, filed Feb. 2002, Hannigan et al.

U.S. Appl. No. 13/089,816, filed Apr. 19, 2011, Geoffrey B. Rhoads, et al.

U.S. Appl. No. 08/512,993, filed Aug. 9, 1995, Geoffrey B. Rhoads.

* cited by examiner

ASSOCIATING MEDIA THROUGH ENCODING

RELATED APPLICATION DATA

This application is a continuation of U.S. patent application Ser. No. 10/172,506, filed on Jun. 14, 2002 (published as US 2003-0150922 A1; now U.S. Pat. No. 6,869,023). The 10/172,506 application is a continuation in part of U.S. patent application Ser. No. 10/094,593, filed Mar. 6, 2002 (published as US 2002-0170966 A1). The Ser. No. 10/172,506 application also claims the benefit of U.S. Provisional Patent Application No. 60/356,881, filed Feb. 12, 2002.

The present invention also relates to assignee's U.S. Pat. No. 6,332,031 (issued on Dec. 18, 2001).

Each of the above-mentioned patent documents is herein incorporated by reference.

TECHNICAL FIELD

The present invention relates to steganography and digital watermarking.

BACKGROUND AND SUMMARY

Digital watermarking technology, a form of steganography, encompasses a great variety of techniques by which plural bits of digital data are hidden in some other object, preferably without leaving human-apparent evidence of alteration.

Digital watermarking may be used to modify content to embed a machine-readable code into the media content. The content may be modified such that the embedded code is imperceptible or nearly imperceptible to the user, yet may be detected through an automated detection process.

Digital watermarking systems typically have two primary components: an embedding component that embeds the watermark in the media content, and a reading component that detects and reads the embedded watermark. The embedding component embeds a watermark pattern, e.g., by altering or adding data samples of the media content. The reading component analyzes content to detect whether a watermark pattern is present. In applications where the watermark encodes information, the reading component extracts this information from the detected watermark. Assignee's U.S. patent application Ser. No. 09/503,881, filed Feb. 14, 2000 (now U.S. Pat. No. 6,614,914), discloses various encoding and decoding techniques. U.S. Pat. Nos. 5,862,260 and 6,122,403 disclose still others. Each of these U.S. patent documents is herein incorporated by reference.

While a digital watermark is typically applied to digital content, it may be implemented so as to remain with the content even through transformations to and from the analog domain. In addition to images, watermarking applies to a variety of different media types, including audio and video. Watermarking can also be applied to ordinary media, whether or not it conveys information. Examples include paper, plastics, laminates, product labels and packaging, paper/film emulsions, etc. A watermark can embed a single bit of information, or any number of bits, line an identifier or payload.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. The surface texture of an object may be altered to create a watermark pattern. This may be accomplished by manufacturing an object in a manner that creates a textured surface or by applying material to the surface (e.g., an invisible film or ink) in a subsequent process. Watermarks can also be optically implemented in holograms and conventional paper watermarks.

One aspect of the present invention links documents through digital watermarking. A first document includes a first identifier embedded as a first digital watermark component. The first digital watermark is decoded to obtain the first identifier. The first identifier is altered to provide a second identifier. The second identifier and the first identifier, however, remain related. The second digital watermark is embedded in a second document as a component of a second digital watermark. The second identifier can be extracted from the second document.

Another aspect of the present invention focuses on documents that are subjected to multiple printing stages. A first digital watermark component is embedded during a first printing stage, and a second digital watermark component is embedded during a later printing stage.

Further features and advantages will become even more apparent with reference to the following detailed description and accompanying drawings.

DETAILED DESCRIPTION

Linking Documents with Digital Watermarks

Documents can be linked together, and to a bearer/creator, through secure indicia on an identification document and subsequently issued documents.

An individual (hereafter "bearer") possesses an identification document. The identification document may include a driver's license, passport, government issued identification document, security badge, etc., etc. The identification document preferably includes a photographic and/or a biometric representation of the bearer of the identification document. The biometric representation may include a fingerprint, retinal scan, voice print, facial recognition map, DNA coding, etc. The biometric representation may be printed or embedded in the identification document (e.g., encoded in a 2-D barcode or embedded as a digital watermark) or stored in electronic memory circuitry (as is provided by a so-called Smart Card). The photographic and/or biometric representation offers a layer of security, as it can be checked against the document bearer.

A digital watermark is embedded in the identification document. The digital watermark includes an identifier (or payload).

Figure 1:
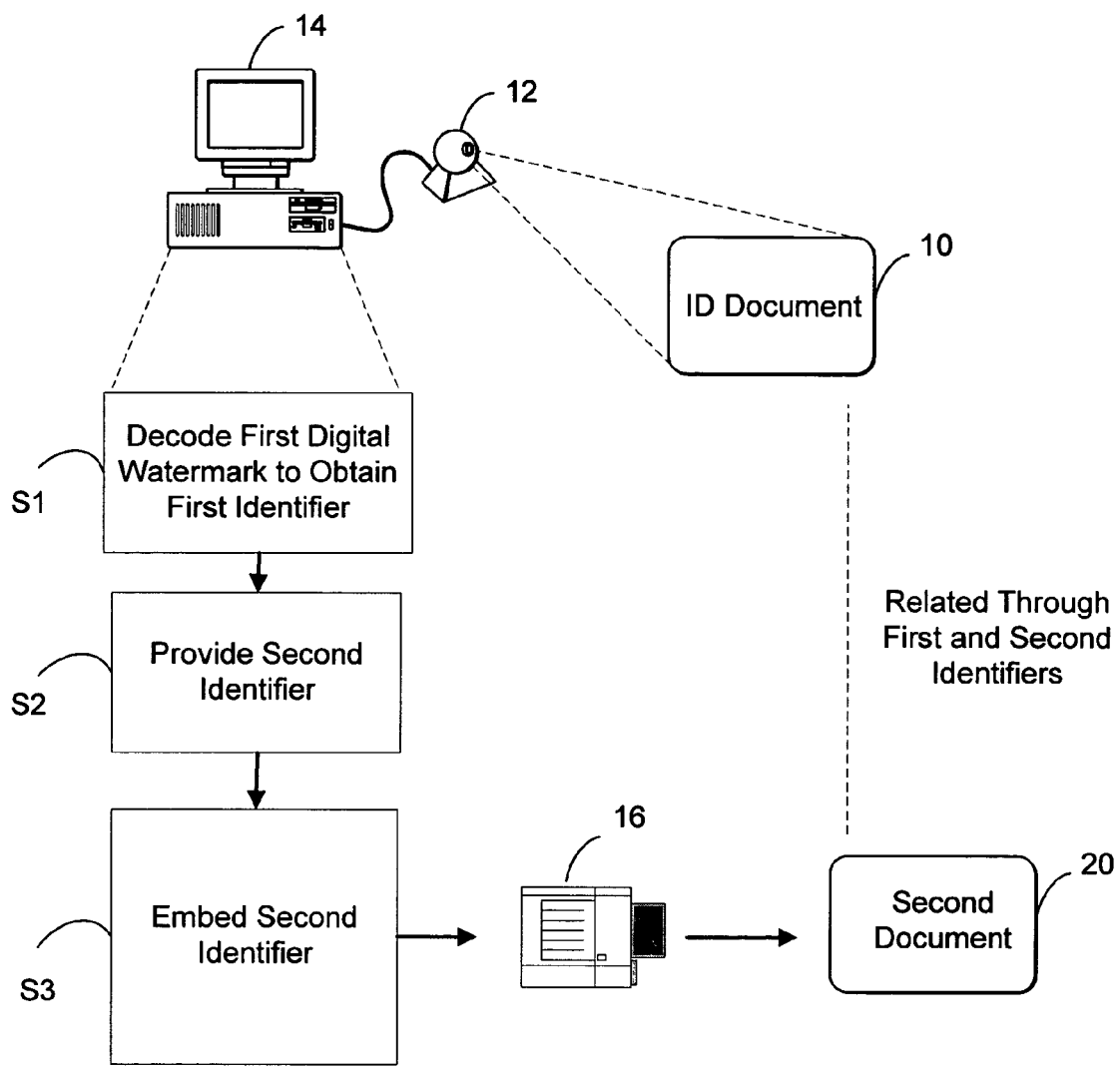
FIG. 1 is a diagram illustrating document linking with digital watermarking.

With reference to FIG. 1, the bearer presents the identification document 10 to a document issuer as is customary, e.g., at an airline check-in counter. An input device 12 captures an image of the identification document 10. Input device 12 may include a digital camera, optical sensor, web camera, CCD array, scanner, 2-D bar code reader, etc. The captured imagery is communicated to a computing device 14. We note that while input device 12 is illustrated as being physically tethered to the computing device 14, the present invention is not so limited. Instead, input device 12 may wirelessly communicate with computer device 14. Of course input device 12 may communicate with computing device 14 through a network such as the internet, LAN, WAN, etc. Or input device 12 may store captured imagery to a disk or flash memory card, which can be read by computing device 14. Computer device 14 may take a variety of forms, including a general purpose computer, hand held device, scanning pen, 2-D bar code reader, network computer, distributed computers, etc. Computing device 14 preferably includes system memory and electronic processing circuitry (e.g., CPU). The processing circuitry communicates with the system memory via a system bus.

A digital watermark detector analyzes the captured imagery to detect and decode the first digital watermark. The digital watermark detector typically includes software instructions that reside in the computing device's 14 system memory. The software instructions execute on the electronic processing circuitry. The digital watermark detector decodes the first digital watermark to obtain the identifier (step S1). For clarity, we refer to the decoded digital watermark identifier as a "first identifier."

A second identifier is provided (step S2). This second identifier will be embedded in a second document as a second digital watermark component. The second identifier can be provided in a number of ways. Yet, regardless of the providing technique, the first and second identifiers are preferably related. In one implementation, the second identifier is a copy of the first identifier. But to prevent someone from merely copying the first watermark identifier from the ID document to some fake second document, it is useful to alter the first identifier in some way that maintains a relationship between the two documents but does not yield the same watermark identifier.

The alteration may include a cryptographic permutation of the first identifier. The second identifier then comprises this permutation. Or the alternation may include setting an identifier bit(s) to indicate that the second identifier is a child of the first identifier. Still further, the alternation may include adding additional data to the first identifier and then embedding the augmented first identifier as the second identifier. Still further, the second identifier may be randomly or pseudo-randomly chosen. A database or data record can be used to associate the randomly (or pseudo-randomly) chosen second identifier with the first identifier.

In other cases, the first identifier includes a first set of information and the second identifier includes a second set of information. The first and second sets are preferably related. For example, the first set may include a key that unlocks, decrypts or otherwise decodes the second set. Or the first set may include some personal data (e.g., bearer's first name) while the second set includes related personal data (e.g., bearer's last name).

The second identifier is embedded in a second document 20 (step S3). The second document 20 may include a boarding pass, transportation ticket, baggage tag or receipt, event ticket, printed document, envelope, invitation, security badge, etc., etc. The second document 20 is printed with a printer 16. (We note that in an alternative, but related implementation, the second document can be retained in electronic form. The electronic form includes the digital watermark. The embedded electronic form can be transferred to, e.g., a handheld device for later verification.).

It should be appreciated that the present invention is not limited to having the embedding step S3 carried out by computing device 14. Indeed, once obtained the second identifier can be embedded by another computing device, which communicates the embedded information to printer 16. Also, many of today's printers include sophisticated computing capability, so printer 16 could alternatively carry out embedding step S3. Additionally, a device other than computing device 14 can carry out the provision of a second identifier (i.e., step S2).

The identification document 10 and second document 20 are linked through the two digital watermark identifiers. In particular, the identification document's 10 first identifier and the second document's 20 second identifier are related (also referred to as "linked"). Such a relationship enables an additional layer of verification when the bearer presents the identification document 10 and the second document 20, e.g., to board a plane, access a secure location, etc., etc.

Figure 2:
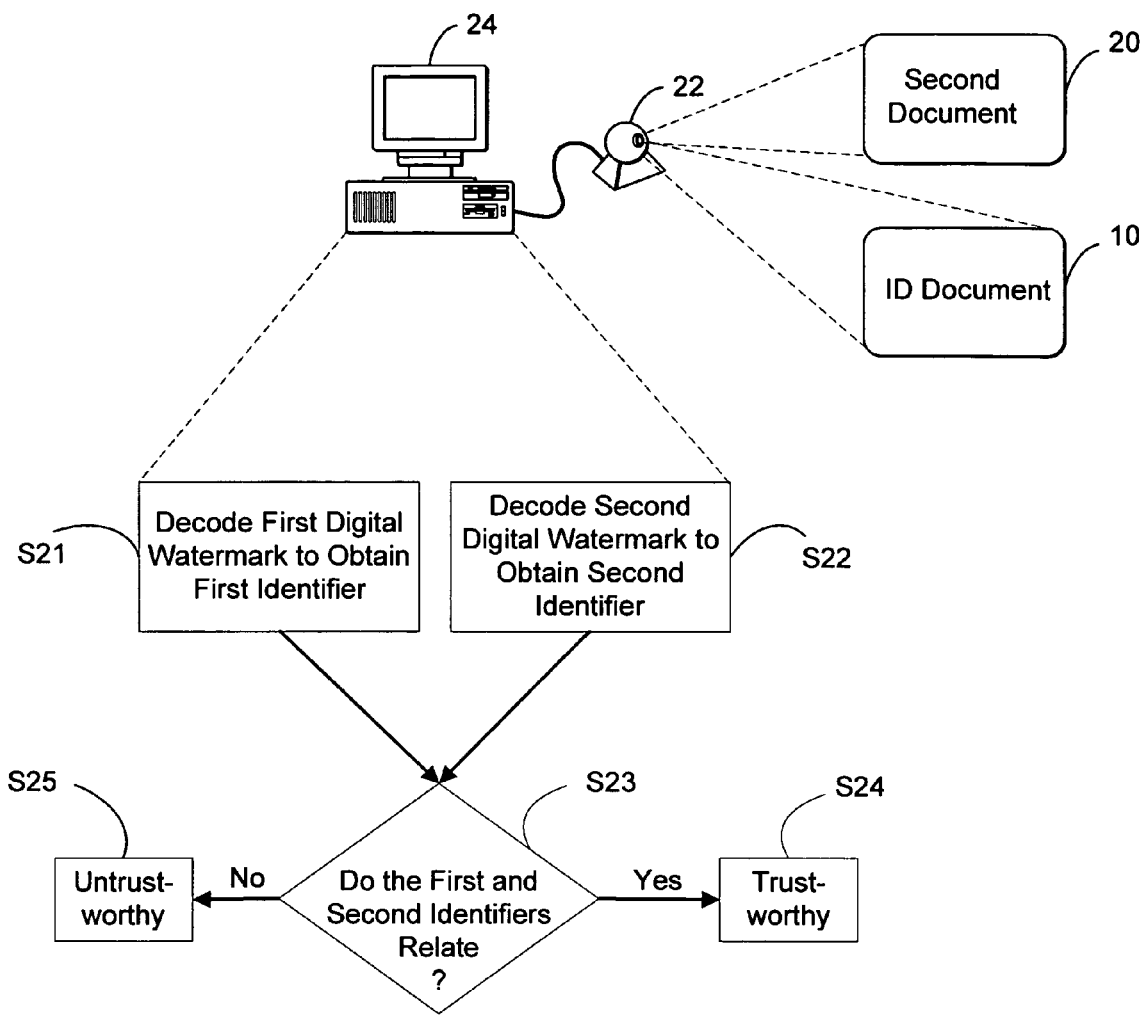
FIG. 2 is a diagram illustrating an authentication process for documents linked according to the FIG. 1 process.

With reference to FIG. 2, the bearer presents the identification document 10 and the second document 20 to an input device 22. The input device 22 may be located at a boarding gate, secured access point, event entrance, etc. The captured imagery is communicated to a computing device 24. The computing device 24 includes a digital watermark detector. The digital watermark detector decodes the first and second digital watermarks embedding in the captured imagery of documents 10 and 20 to obtain the first and second identifiers (steps S21 and S22). The order of the presentment and decoding is not critical, unless one of the identifiers is used to decode, find or decrypt the other identifier. The computing device 24 (e.g., via software executing on computer device 24) determines whether the first and second identifiers relate or otherwise coincide (step S23). For example, the various identifier relationships or alterations discussed above can be explored. The second document is considered trustworthy when the two identifiers are related (step S24). Otherwise, the second document is considered untrustworthy (step S25).

Our inventive concepts apply to other forms of printable secure indicia, like some types of bar codes and scrambled indicia. For example, the identification document may include an embedded digital watermark identifier, but the second document includes a second identifier in the form of a secure 2-D bar code. We can even extend this to other machine-readable codes, but these codes should be readable from the identification document and then be writable to the second document that is issued. Some examples include magnetic strip readers and writers, smart cards, etc. We note, however, that the inherent characteristics of a digital watermark make the digital watermark a much-preferred solution.

Our inventive system and methods for linking documents also provide a solution for home printing of say tickets and boarding passes. For example, a user presents her photo ID to a home computer. A first digital watermark identifier is extracted from the photo ID, perhaps altered and is then embedded as a second identifier in tickets printed on a home printer. The embedded ticket is then verified at an airport gate using the FIG. 2 method.

It should be appreciated that this aspect of the present invention applies to many other types of documents. For example, consider an office setting where related papers or charts are linked. Or a receipt can be linked to a credit card that is used for a purchase evidenced by the receipt. Still further, medical records can be linked to insurance cards or patient ID tags (or wristbands). Or newborn baby arm tags can be linked to tags worn by their mothers and fathers. Traveler's checks can be linked to a bearer's documentation. The possibilities are many.

Multiple Watermark Components

There are many situations in which a document is subjected to multiple printing stages, using perhaps different printing processes or printers. Consider a birth certificate for example. A birth certificate is initially printed using a high quality printing process (e.g., an offset printing process or dye diffusion printing process, silk screening, lithography, ink jet, flexography, letter press, etc., etc.). This initial printing process prints so-called "fixed" information, like generic text, designs, lines, state seal, etc. This type of printing can be labor intensive and expensive. Yet this high quality printing provides a favorable channel for embedding a robust digital watermark component.

The birth certificate is later printed with so-called "variable" information, like a baby's name, date and location of birth, etc. This variable information personalizes the birth certificate to a new child. A relatively low quality printing process (e.g., laser jet or ink jet printer, etc.) typically carries out this second printing. This low quality printing process may not always be conducive to robust watermark embedding.

One aspect of the present invention provides a watermark embedding technique that capitalizes on these different types of printing environments—a high quality printing process and a low quality, but perhaps faster, printing process. In particular, a first digital watermark component is embedded during an initial printing stage, while a second digital watermark component is embedded during a later printing stage.

Figure 3:
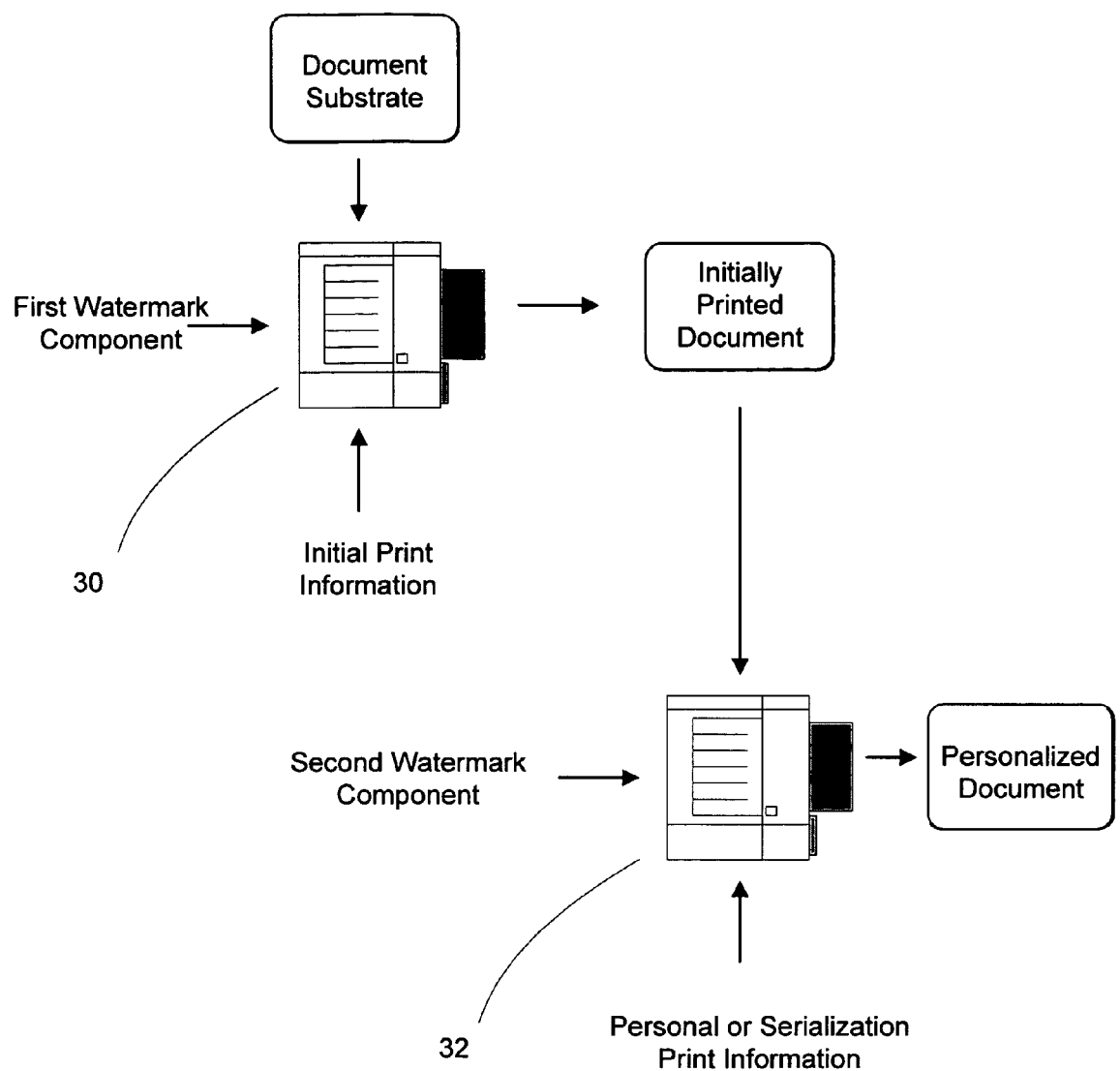
FIG. 3 is a diagram illustrating multi-stage printing and watermark embedding.

Consider FIG. 3. A high quality printing process 30 is used to initially print a document substrate. Although not separately illustrated, printing process 30 may include both a computing device and a printing device or process. Printing process 30 receives as inputs initial print information and a first digital watermark component. We note that in some implementations the first digital watermark is embedded in the initial print information (or an image of such), and the embedded initial print information is provided to printing process 30. Printing process 30 applies the initial print information and the first digital watermark component to the document substrate. As discussed above, this initial printing stage is typically used to print fixed information, artwork and/or designs on the document substrate.

The initially printed document is subjected to a later printing process 32. Although not separately illustrated, printing process 32 may include both a computing device and a printing device or process. The printing process 32 receives as inputs personal information (e.g., so-called variable information) and a second digital watermark component. Of course, the second digital watermark component can be embedded in the personal information (or an image of such), and the embedded personal information is then provided to the later printing process 32. The printing process 32 applies the personal information and the second digital watermark component to the initially printed document to produce a personalized document.

We now provide digital watermark component details for each of the initial printing stage (e.g., printing process 30) and the later printing stage (e.g., printing process 32).

Initial Printing Stage

In a first implementation a first digital watermark component includes a so-called grid or orientation component (see, e.g., assignee's patent application Ser. Nos. 10/154,621 (U.S. Pat. No. 6,973,197) and 09/503,881 (U.S. Pat. No. 6,614,914)). An orientation component is helpful in resolving image distortion such as rotation, scale and translation. Proper image orientation is sometimes helpful when decoding a watermark payload or message. In some cases the orientation component identifies an image reference point or origin. A watermark detector may use the reference point or origin to improve message or payload detection.

In another implementation, the first digital watermark component includes an identifier. The identifier may be in the form of an embedded payload, message bit(s) or may even be reflected by a type or format of an orientation component. The identifier can carry information such as fixed information that is printed on the document. Or the identifier may include information such as a batch run number, printer location, identification number, expected distribution channel, etc. The identifier alternatively may indicate the type of document in which it is embedded in, e.g., signaling that a document is an identification document or boarding pass.

The identifier may also carry information that provides decoding clues to help resolve a second digital watermark component. In one case the clue points to where the second digital watermark should be located or embedded in the document. (E.g., consider an identification document in which the clue indicates that the second digital watermark is embedded in a photograph or region with a variance or local contrast level above a certain threshold.). In another case a clue provides a decryption or decoding key for decrypting or decoding the second digital watermark. In still another case the clue indicates which message protocol is used for forming or embedding the second digital watermark component.

The identifier may also signal to a watermark detector that the document is embedded with a second digital watermark component. This may encourage the watermark detector to continue searching for the second digital watermark component. This aspect of the present invention may also be used for authentication purposes. For example, consider a batch of identification documents (or document substrates) that are misappropriated after initial printing, but before personalization. The initial printing embeds a first digital watermark component including an identifier. The identifier carries information indicating that a second digital watermark component is expected. An authentication process then requires detection and successful decoding of the second digital watermark component before the identification document is considered trusted. In the case of a misappropriated identification document, a forgery process used to personalize the misappropriated identification document may not include a second digital watermark component, or if it does include such a component, it might not properly relate to the identifier's clue.

The identifier may also include a pointer or link to a data record. The pointer may be used as an index to interrogate a database to retrieve the data record. The data record includes information regarding the type of watermark embedding, the type of document in which the pointer is embedded, and/or characteristics regarding the second digital watermark. The data record may also include tell-tale signs about the document or second watermark component embedding, e.g., like image locations, areas of high noise, document areas unlikely to include a watermark signal, watermark message protocol, etc. The second watermark detector can use these tell-tale signs to help refine the search for the second digital watermark component.

In still another implementation, the first digital watermark component includes both an identifier and an orientation component.

Second Printing Stage

After first component embedding and initial printing, the document is subjected to second or later printing. A likely scenario is that a batch of documents is initially printed and then provided to a document issuer (e.g., like a DMV, state records office, company, etc.). The document issuer personalizes a document to correspond to an individual. Or the document is serialized for identification. The personalization usually takes the form of printing names, addresses, social security numbers, photographs and/or biometric information (e.g., fingerprint), etc., etc. We capitalize on this second printing stage to embed a second digital watermark component. While we imagine that the second digital watermark component will most frequently be located in document region where the second, personalized printing occurs, the present invention is not so limited. Indeed, the second printing can also reprint areas of the document that have been initially printed to embed the second digital watermark component.

In one implementation, the second digital watermark component includes a message or payload. The payload will often reflect personalized information, e.g., corresponding to the printed variable information or to a serialization scheme. In the case of embedding variable information, the second digital watermark can be read and compared against the printed variable information to determine whether the document is authentic, or whether the document's printed variable information may have been altered. The payload may also include information that is related to the first digital watermark component. The relationship may be a cryptographic permutation, subset of information, related identifiers, decoding or decryption keys, etc.

In another implementation, detection of the second digital watermark component is improved when the first digital watermark component includes an orientation component. The orientation component is determined to help locate the second digital watermark component. The orientation component may also be helpful in resolving image distortion issues. There may be issues of registration with this implementation—meaning that the second digital watermark component should be properly aligned and embedded on the document to take advantage of the first digital watermark component's orientation clues. There are many possible registration techniques. For example, in some card and ID document printers, the printer physically aligns the card to receive printing. The physical orientation of the card can be relied upon to provide appropriate alignment for the second printing. Or the physical alignment can be taken into consideration by a watermark embedder, to adjust for the physical alignment if needed. Another technique uses fiducials or alignment marks that are initially printed on a document surface. Optical sensors capture an image of the document. The captured image is then analyzed by pattern recognition software to detect the fiducials. The printing/embedding or the document's alignment can be adjusted based on the detection characteristics, if needed. Still another technique uses the orientation clues provided by the first digital watermark orientation component to help align the printing/embedding or document position. (Depending on the printing resolution, we note that registration may not be an issue. For example, signals embedded at low-resolution do not need terribly tight registration.).

Utilizing an aspect of the present invention which separates an orientation component and a payload component, a large, high-quality expensive print run of the document can be performed, and then with a lower quality non-expensive printer, an image with a variable payload is printed in a selected area of the document without detracting from the aesthetics created by the high quality printing.

In another implementation, the second digital watermark component includes both an orientation component and a payload or identifier component.

In still another implementation, a document receives more than two digital watermark components. The additional digital watermark components can be printed at still additional printing stages.

While the examples above have offered a few types of documents that may benefit from our techniques, we note that the present invention is not so limited. Indeed, traveler's checks, checks, banknotes, security documents, certificates of authenticity, stock certificates, etc., and other documents that are subjected to multiple printing stages can benefit from our techniques.

In yet another implementation, the second digital watermark component comprises a fragile digital watermark component. The fragile component is designed to be lost or to predictably degrade upon some signal processing, like scanning and printing, copying, compression, etc.

Advantages

There are many advantages to our dual-stage embedding where a first watermark component is embedded with a first printing process, and a second watermark component is embedded with a second printing process. One advantage is that the first component may be more robust, since it is often printed with higher quality techniques. Also, in some cases an extensive, high-quality printing run may be less onerous if each of the printed documents includes the same watermark component (e.g., same orientation component or same identifier). Serialization or personalized embedding can occur at a later time, on a document-by-document basis. Another advantage is that in some cases the dual watermark components can be used to buttress the security of a document, e.g., by relating the two components in some fashion. Of course there are other advantages that are apparent from the above detailed description.

Concluding Remarks

Having described and illustrated the principles of the invention with reference to specific implementations, it will be recognized that the principles thereof can be implemented in many other, different forms. To provide a comprehensive disclosure without unduly lengthening the specification, applicants incorporate by reference the patents and patent applications referenced above.

We note that the discussion regarding input device 12 and computing device 14 can be applied to input device 22 and computing device 24 as well. Also, instead of a software implementation, a digital watermark detector can be implemented with a hardware or hardware/software implementation.

The section headings in this document are provided for the reader's convenience and are not intended to limit the invention. Disclosure found under one section heading can be readily combined with disclosure found under another section heading.

In some of the above-described implementations, the first digital watermark component and the second digital watermark component are separate and distinct watermarks. Each component may be embedded using the same or different watermarking protocol and message format.

The particular combinations of elements and features in the above-detailed embodiments are exemplary only; the interchanging and substitution of these teachings with other teachings in this and the incorporated-by-reference patents/applications are expressly contemplated.

What is claimed is:

1. A method of associating first media with at least second media, wherein the first media comprises encoded first auxiliary information, and wherein the first auxiliary information is auxiliary to the first media, the method comprising:

receiving electronic data representing at least a portion of the first media, wherein the electronic data is obtained from a portable storage device;

decoding the encoded first auxiliary information from the electronic data to obtain the first auxiliary information;

providing second auxiliary information, wherein the second auxiliary information is based on the first auxiliary information and is auxiliary to the second media;

encoding the second auxiliary information in the second media by altering data representing the second media to yield encoded second media, wherein the second media comprises an electronic form; and storing the encoded second media in a storage device in a handheld device, wherein the first media and the second media are associated via the first auxiliary information and the second auxiliary information.

2. The method of claim 1, wherein the second auxiliary information comprises the first auxiliary information.

3. The method of claim 1, wherein the second auxiliary information comprises a cryptographic permutation of the first auxiliary information.

4. The method of claim 1, wherein the second auxiliary information is randomly or pseudo-randomly generated based on the first auxiliary information.

5. The method of claim 1, wherein the second auxiliary information is related to the first auxiliary information through association in a database or data record.

6. The method of claim 1, wherein the first media comprises a printed document and the electronic data comprises optical scan data.

7. The method of claim 6, wherein the printed document comprises at least one of a driver's license, passport, government issued identification document, security badge, traveler's check, check, banknote, security document, certificate of authenticity or stock certificate.

8. The method of claim 1, wherein the portable storage device resides on a smartcard or electronic memory carried by a physical document.

9. The method of claim 1, wherein the encoding comprises steganographic encoding.

10. The method of claim 1, wherein the encoding comprises digital watermarking.

11. An authentication method to authenticate second media associated according to the method of claim 1, the authentication method comprising:

decoding the first auxiliary information from the first media;

decoding the second auxiliary information from the second media; and comparing the first auxiliary information and the second auxiliary information to determine whether the second media is authentic.

12. The method of claim 1, wherein each of the first auxiliary information and the second auxiliary information comprises plural-bit information.

13. A method of associating a physical object with a media file, wherein the physical object comprises encoded first auxiliary information, and wherein the first auxiliary information is auxiliary to the physical object, the method comprising:

receiving optical scan data representing at least a portion of the physical object;

decoding the encoded first auxiliary information from the optical scan data to obtain the first auxiliary information;

providing second auxiliary information, wherein the second auxiliary information comprises a mathematical relationship to the first auxiliary information and is auxiliary to the media file, wherein the second auxiliary information is not the same as the first auxiliary information;

encoding the second auxiliary information in the media file to yield an encoded media file, wherein the media file comprises an electronic form; and storing the encoded media file in a storage device, wherein the physical object and the media file are associated via the first auxiliary information and the second auxiliary information.

14. The method of claim 13, wherein the physical object comprises at least one of a driver's license, passport, government issued identification document, security badge, traveler's check, check, banknote, security document, certificate of authenticity or stock certificate.

15. The method of claim 13, wherein the storage device resides on a handheld device.

16. The method of claim 13, wherein the storage device resides on a smartcard or electronic memory carried by the physical object.

17. The method of claim 13, wherein the encoding comprises at least one of steganographic encoding or digital watermarking.

18. The method of claim 13, wherein each of the first auxiliary information and the second auxiliary information comprises plural-bit information.

19. A method of associating a physical object with a media file, wherein the physical object comprises encoded first auxiliary information, and wherein the first auxiliary information is auxiliary to the physical object, the method comprising:

receiving optical scan data representing at least a portion of the physical object;

decoding the encoded first auxiliary information from the optical scan data to obtain the first auxiliary information;

providing second auxiliary information, wherein the second auxiliary information comprises a mathematical relationship to the first auxiliary information and is auxiliary to the media file, wherein the second auxiliary information is randomly or pseudo-randomly generated;

encoding the second auxiliary information in the media file to yield an encoded media file, wherein the media file comprises an electronic form; and storing the encoded media file in a storage device, wherein the physical object and the media file are associated via the first auxiliary information and the second auxiliary information.

20. A non-transitory computer readable medium having instructions stored thereon that, if executed by a computing device, cause the computing device to perform operations comprising:

receiving electronic data representing at least a portion of the first media, wherein the electronic data is obtained from a portable storage device, wherein the first media comprises encoded first auxiliary information, and wherein the first auxiliary information is auxiliary to the first media;

decoding the encoded first auxiliary information from the electronic data to obtain the first auxiliary information;

providing second auxiliary information, wherein the second auxiliary information is based on the first auxiliary information and is auxiliary to the second media;

encoding the second auxiliary information in the second media by altering data representing the second media to yield encoded second media, wherein the second media comprises an electronic form; and storing the encoded second media in a storage device in a handheld device, wherein the first media and the second media are associated via the first auxiliary information and the second auxiliary information.

21. An apparatus comprising:
a processor configured to:
receive electronic data representing at least a portion of the first media, wherein the electronic data is obtained from a portable storage device, wherein the first media comprises encoded first auxiliary information, and wherein the first auxiliary information is auxiliary to the first media;
decode the encoded first auxiliary information from the electronic data to obtain the first auxiliary information;
provide second auxiliary information, wherein the second auxiliary information is based on the first auxiliary information and is auxiliary to the second media;
encode the second auxiliary information in the second media by altering data representing the second media to yield encoded second media, wherein the second media comprises an electronic form; and
store the encoded second media in a storage device in a handheld device, wherein the first media and the second media are associated via the first auxiliary information and the second auxiliary information.

22. A non-transitory computer readable medium having instructions stored thereon that, if executed by a computing device, cause the computing device to perform operations comprising:
receiving optical scan data representing at least a portion of a physical object, wherein the physical object comprises encoded first auxiliary information, wherein the first auxiliary information is auxiliary to the physical object;
decoding the encoded first auxiliary information from the optical scan data to obtain the first auxiliary information;
providing second auxiliary information, wherein the second auxiliary information comprises a mathematical relationship to the first auxiliary information and is auxiliary to the media file, wherein the second auxiliary information is not the same as the first auxiliary information;
encoding the second auxiliary information in the media file to yield an encoded media file, wherein the media file comprises an electronic form; and
storing the encoded media file in a storage device, wherein the physical object and the media file are associated via the first auxiliary information and the second auxiliary information.

23. An apparatus comprising:
a processor configured to:
receive optical scan data representing at least a portion of a physical object, wherein the physical object comprises encoded first auxiliary information, wherein the first auxiliary information is auxiliary to the physical object;
decode the encoded first auxiliary information from the optical scan data to obtain the first auxiliary information;
provide second auxiliary information, wherein the second auxiliary information comprises a mathematical relationship to the first auxiliary information and is auxiliary to the media file, wherein the second auxiliary information is not the same as the first auxiliary information;
encode the second auxiliary information in the media file to yield an encoded media file, wherein the media file comprises an electronic form; and
store the encoded media file in a storage device, wherein the physical object and the media file are associated via the first auxiliary information and the second auxiliary information.

24. A non-transitory computer readable medium having instructions stored thereon that, if executed by a computing device, cause the computing device to perform operations comprising:
receiving optical scan data representing at least a portion of a physical object, wherein the physical object comprises encoded first auxiliary information, and wherein the first auxiliary information is auxiliary to the physical object;
decoding the encoded first auxiliary information from the optical scan data to obtain the first auxiliary information;
providing second auxiliary information, wherein the second auxiliary information comprises a mathematical relationship to the first auxiliary information and is auxiliary to the media file, wherein the second auxiliary information is randomly or pseudo-randomly generated;
encoding the second auxiliary information in the media file to yield an encoded media file, wherein the media file comprises an electronic form; and
storing the encoded media file in a storage device, wherein the physical object and the media file are associated via the first auxiliary information and the second auxiliary information.

25. An apparatus comprising:
a processor configured to:
receive optical scan data representing at least a portion of a physical object, wherein the physical object comprises encoded first auxiliary information, and wherein the first auxiliary information is auxiliary to the physical object;
decode the encoded first auxiliary information from the optical scan data to obtain the first auxiliary information;
provide second auxiliary information, wherein the second auxiliary information comprises a mathematical relationship to the first auxiliary information and is auxiliary to the media file, wherein the second auxiliary information is randomly or pseudo-randomly generated;
encode the second auxiliary information in the media file to yield an encoded media file, wherein the media file comprises an electronic form; and
store the encoded media file in a storage device, wherein the physical object and the media file are associated via the first auxiliary information and the second auxiliary information.

* * * * *

UNITED STATES PATENT AND TRADEMARK OFFICE
CERTIFICATE OF CORRECTION

PATENT NO.        : 8,087,583 B2
APPLICATION NO.   : 11/082182
DATED             : January 3, 2012
INVENTOR(S)       : Hawes It is certified that error appears in the above-identified patent and that said Letters Patent is hereby corrected as shown below:

Title Page 2, in Field (56), under "U.S. PATENT DOCUMENTS", in Column 2, Line 16, delete "2001/0116852" and insert -- 2001/0016852 Al --, therefor.

Title Page 2, in Field (56), under "FOREIGN PATENT DOCUMENTS", in Column 2, Line 6, delete "08-505898" and insert -- 08-50598 --, therefor.

Title Page 2, in Field (56), under "OTHER PUBLICATIONS", in Column 2, Line 9, delete ""Protofoli:" and insert -- "Protofoil: --, therefor.

Title Page 2, in Field (56), under "OTHER PUBLICATIONS", in Column 2, Line 14, delete "Systemsm, Denever," and insert -- Systems, Denver, --, therefor.

Signed and Sealed this
Tenth Day of July, 2012

David J. Kappos
*Director of the United States Patent and Trademark Office*